United States Patent [19]
Nanke

[11] Patent Number: 5,267,227
[45] Date of Patent: Nov. 30, 1993

[54] DISK STORAGE APPARATUS WITH AN ACTUATOR LOCKING DEVICE

[75] Inventor: Koichiro Nanke, Fujisawa, Japan

[73] Assignee: International Business Machines Corporation, Armonk, N.Y.

[21] Appl. No.: 776,103

[22] Filed: Oct. 15, 1991

[51] Int. Cl.5 .................. G11B 17/04; G11B 21/16
[52] U.S. Cl. .................................. 369/77.1; 369/249
[58] Field of Search ............... 369/77.1, 77.2, 249, 369/247

[56] References Cited

U.S. PATENT DOCUMENTS

| | | | |
|---|---|---|---|
| 4,433,406 | 2/1984 | Saito et al. | 369/77.2 |
| 4,623,995 | 11/1986 | Kawamura et al. | 369/77.2 |
| 4,625,304 | 11/1986 | Kanamaru et al. | 369/77.2 |
| 4,661,869 | 4/1987 | Takeda et al. | 369/77.2 |
| 4,914,647 | 4/1990 | Ono et al. | 369/244 |
| 4,941,140 | 7/1990 | Ono et al. | 369/77.2 |
| 5,026,099 | 10/1991 | Odawara et al. | 369/77.1 |
| 5,153,793 | 10/1992 | Takatori et al. | 360/102 |

FOREIGN PATENT DOCUMENTS 63-23233 1/1988 Japan .

*Primary Examiner*—Edward P. Westin
*Assistant Examiner*—S. Allen
*Attorney, Agent, or Firm*—M. W. Schecter; C. E. Rohrer

[57] ABSTRACT

Disk storage apparatus includes a loading and unloading mechanism for moving a recording disk from an insertion position to a reproduction position within the apparatus. When the disk is in the reproduction position, a locking mechanism is moved out of contact with an actuator which carries a read/write head so that the head can be moved across the surface of the disk by a motor mounted on the actuator. When an eject command is received, the actuator is moved to an inner crash stop and the disk is moved out of the reproduction position causing the locking mechanism to move into mechanical engagement with the actuator. A magnet carried on the locking means is moved adjacent a magnet within the motor so that the mechanical locking engagement is enhanced magnetically.

8 Claims, 8 Drawing Sheets

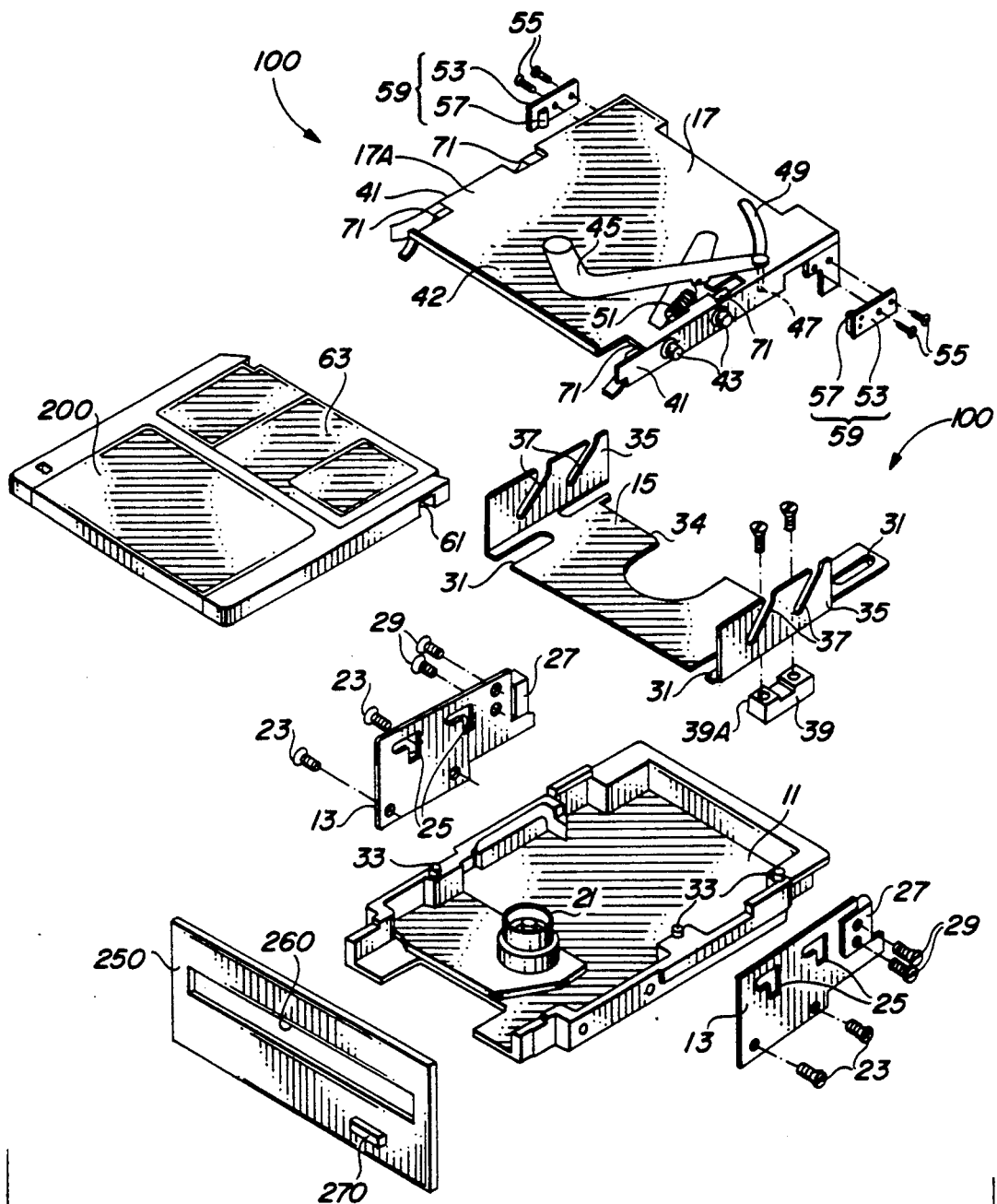

RECORDING MEDIUM INSERTION POSITION

RECORDING MEDIUM LATCH POSITION

INFORMATION REPRODUCTION POSITION

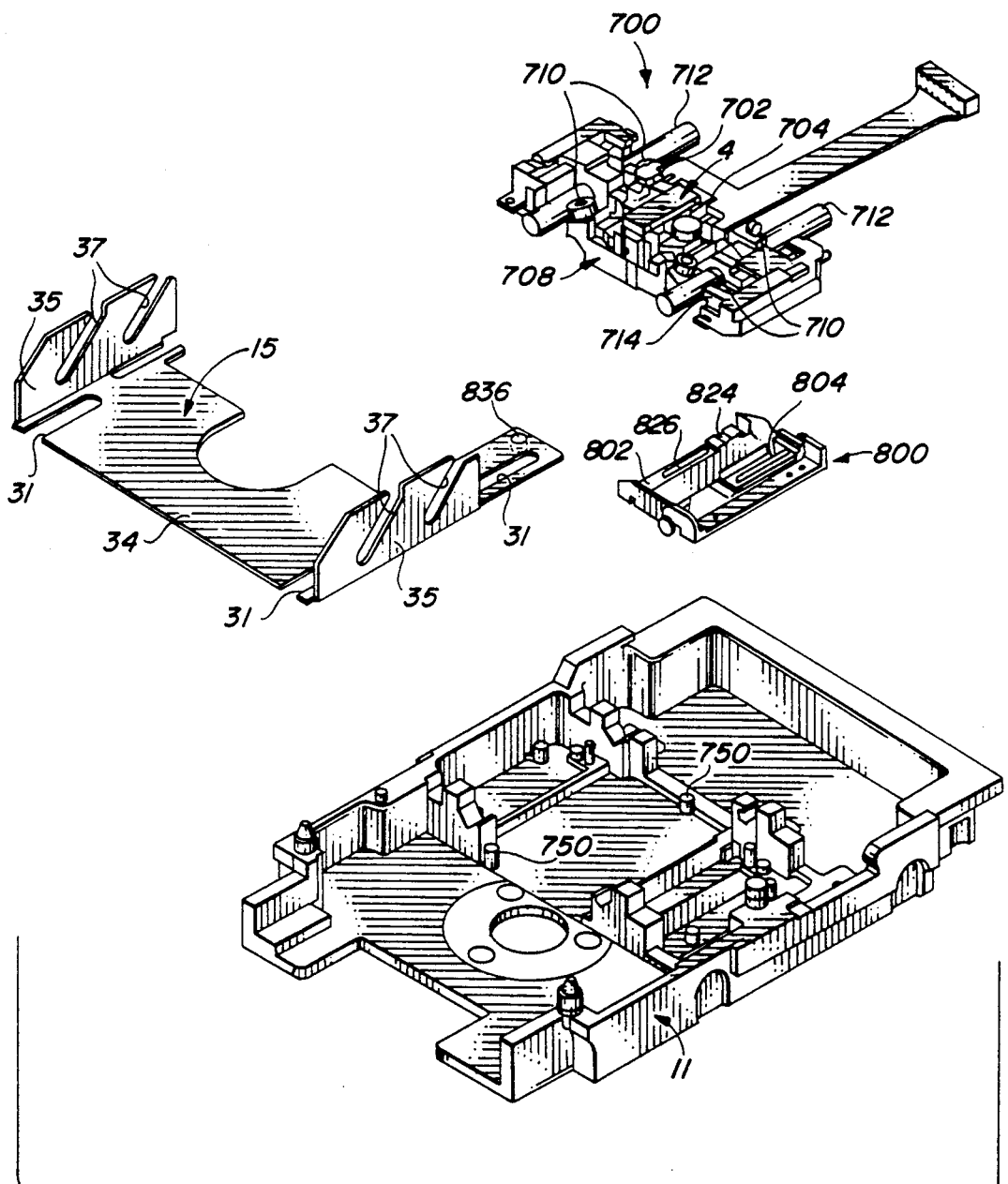

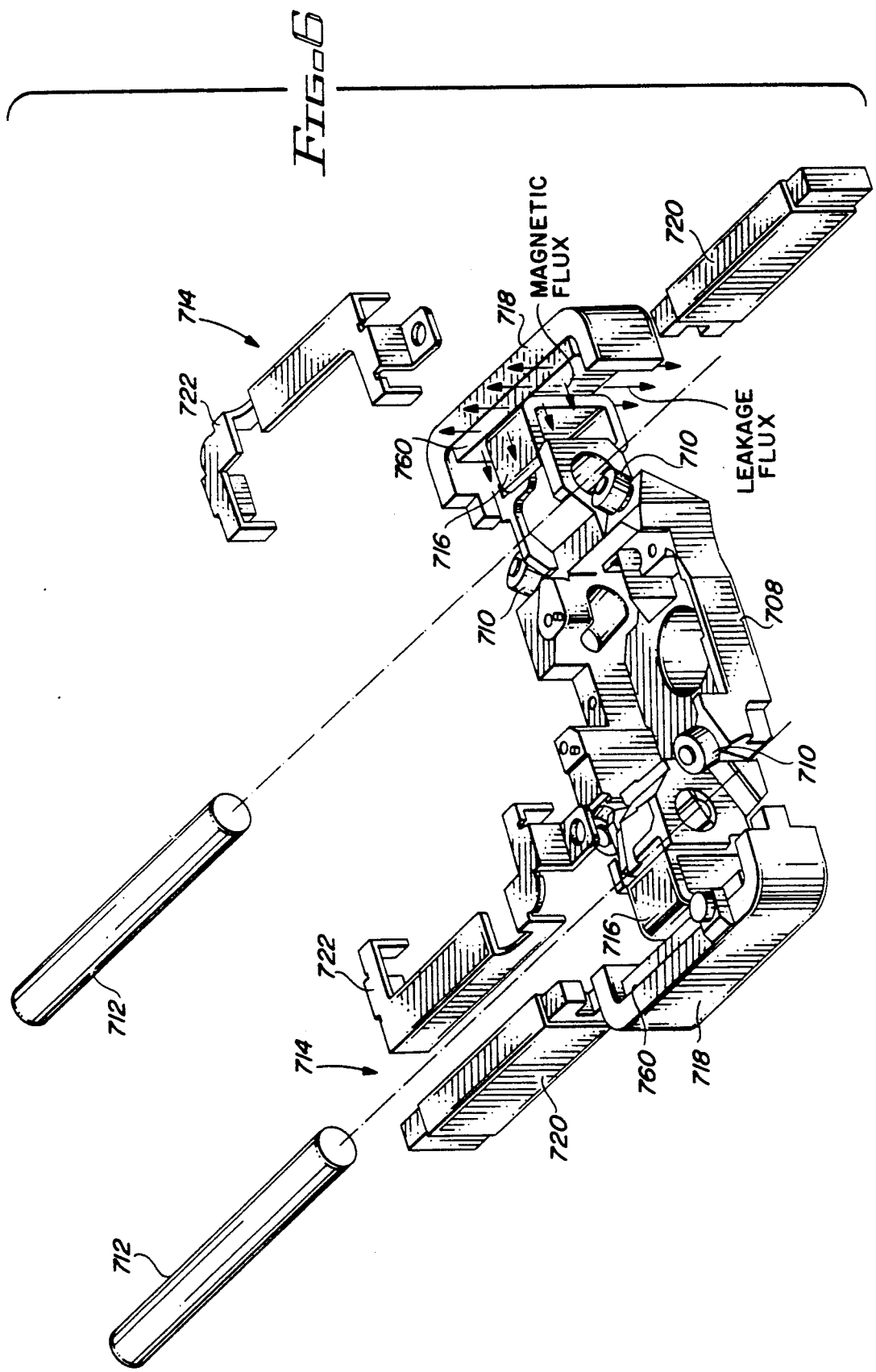

DISK REPRODUCTION POSITION

DISK EJECTION POSITION

DISK STORAGE APPARATUS WITH AN ACTUATOR LOCKING DEVICE

This invention relates to an information reproduction apparatus such as an optical disk storage apparatus, etc. and more particularly to a locking mechanism for locking an actuator which carries a read/write head within the information reproduction apparatus in order to protect the actuator from being damaged due to vibration or mechanical shock.

BACKGROUND OF THE INVENTION

An actuator, within an information reproduction apparatus, in particular, a linear actuator of an optical disk storage apparatus, has mounted precision instruments such as optical instruments or electronic circuits, etc. and can move at a high speed in the radial direction of a disk. Therefore, if the actuator moves freely, it is apt to receive a mechanical shock at the time of transport, etc.

To avoid this, an apparatus having a mechanism for locking the actuator when a recording medium is removed from the information reproduction apparatus, has been already proposed However, locking means for locking the actuator must be usually accommodated in narrow space and thus the allowed range within which said locking means can move is very restricted. In addition, tolerance in each component of the locking means brings about looseness so that the conventional locking means cannot ensure that the actuator is locked.

An object of the present invention is to provide an information reproduction apparatus having locking means which can be accommodated in narrow space and securely lock an actuator

SUMMARY OF THE INVENTION

According to the present invention, in an information reproduction apparatus having an actuator for reading information from a recording medium, the actuator being movable along the surface of the recording medium, loading and unloading means for transferring the recording medium between an initial insertion position and a reproduction position, and locking means linked with the loading and unloading means for locking the actuator, the locking means composed of engagement means which engages with the actuator in order to restrict the movement of the actuator, linking means for linking the engagement means with the loading and unloading means, and magnetic means for enhancing the engagement of the engagement means with the actuator.

The foregoing and other objects, features and advantages of the invention will be apparent from the following more particular description of a preferred embodiment of the invention, as illustrated in the accompanying drawings.

BRIEF DESCRIPTION OF THE DRAWING

FIG. 2 is an exploded perspective view showing the whole construction of an embodiment.

FIG. 5 is an exploded perspective view showing an actuator, locking means, etc. of the embodiment.

FIG. 6 is an exploded perspective side view showing an enlarged carriage assembly and a motor part of an actuator of the embodiment.

DETAILED DESCRIPTION

Figure 1A:
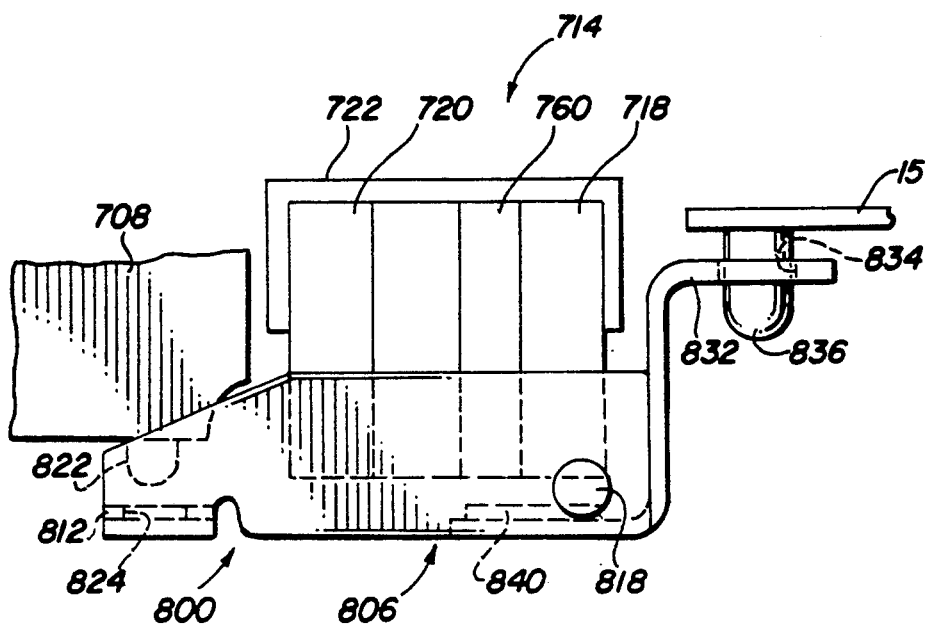
FIG. 1(A) and FIG. 1(B) are enlarged front views showing operations different from each other with respect to the principal part of an embodiment of an information reproduction apparatus constructed in accordance with the present invention.

FIG. 2 shows an embodiment of an information reproduction apparatus constructed in accordance with the present invention. In the figure, loading and unloading means 100 comprises a pair of guide plates 13, a slider bracket 15, and an upper bracket 17 fixed to a base 11.

The base 11 is a nearly square tray, with slightly raised edges, whose longitudinal axis is in the direction of insertion of, for example, a recording medium 200 (such as disk cartridge, etc.) and a spindle motor 21 is mounted on the bottom surface of the base 11. As shown later, a position where the recording medium 200 has been mounted on the spindle motor 21 indicates the reproduction position of the recording medium 200.

On the outside of both side walls of the base 11, the guide plate 13 is fixed by screws 23. Both guide plates 13 are parallel to each other and are fixed perpendicular to the bottom surface of the base 11. In each guide plate 13, two reversed L-shaped slots 25 are arranged horizontally at a predetermined distance. Moreover, at a rear end of the guide plate 13, a latch releasing block 27 is fixed by screws 29.

Between both guide plates 13, the slider bracket 15 is arranged The slider bracket 15 is supported so that it can slide on the upper surface of the base 11. In the bottom surface 34 of the slider bracket 15, multiple long and slender holes 31 are located and, multiple guide bosses 33 in the upper surface of the base 11, penetrate the long and slender holes 31. The holes 31 are elongated in the direction of insertion of the recording medium 200 and the slider bracket 15 is guided by the guide bosses 33 so that it can slide in the direction of insertion. The slider bracket 15 includes raised sections 35, which are parallel to the guide plates 13 and arranged adjacent to the inside of both guide plates 13.

In each of the raised sections 35, multiple oblique slots 37 are located. The oblique slots 37 are inclined slightly upwards from the front (insert slot 260) of the information reproduction apparatus to the rear in the direction of insertion. To the bottom surface 34 of the slider bracket 15, a rack body 39 is fixed by screws 39B at a predetermined position and on the rear side of the rack body 39, as shown in the figure, a rack gear 39A is formed.

The upper bracket 17 is formed into a nearly square plate and its sides are folded downward to form a U shape. The U-shaped sections 41 face each other and hold the recording medium 200 on the bottom surface of the upper bracket 17. From the outside surface of the U-shaped section 41, pins 43 protrude and penetrate both the oblique slots 37 and the reversed L-shaped slots 25. Therefore, if the slider bracket 15 slides forward in the direction of insertion of the recording medium 200, the upper bracket 17 moves accordingly in a reversed L-path along the reversed L-shaped slots 25.

The upper bracket 17 is provided with a shutter driving arm 45, which is attached to a flat section 42 of the upper bracket 17 so that it can turn. At the turning end of the shutter driving arm 45, a shutter driving pin 47 protrudes downward and moves in an arc-shaped slot 49. The shutter driving arm 45 is attached so that its turning end pushes and removes the recording medium 200 by means of a spring 51. If the recording medium 200 is inserted into the upper bracket 17 (U-shaped sections 41), the shutter driving pin 47 contacts the tip (rightmost part in the figure) of the shutter 63 of the recording medium 200 at a predetermined depth of insertion. As the depth of insertion of the recording medium 200 into the slider bracket 17 becomes greater, the shutter 63 slides left in the figure by means of the shutter driving pin 47 and if the recording medium 200 is inserted into the innermost part, the shutter 63 is fully opened.

Each of the U-shaped sections 41 of the upper bracket 17 is provided with a latch spring 53 fixed by screws 55 at predetermined positions of its furthest end and the latch spring 53 has a latch projection 57 formed at its end. The latch spring 53 and the latch projection 57 constructs a latch assembly 59 for latching the recording medium 200. The recording medium 200 has notches 61 formed on both sides toward its rightmost end, and if the recording medium 200 is inserted at a predetermined depth into the upper bracket 17, each latch projection 57 enters each notch 61 and thus the recording medium 200 is latched (held), with the shutter 63 opened, by the upper bracket 17

Moreover, the flat section 42 of the upper bracket 17 has multiple attached leaf springs 71, which push the recording medium 200 held by the U-shaped sections 41 downward so that the recording medium 200 does not rattle within the upper bracket 17.

Front panel 250 contains the insert slot 260 through which the recording medium 200 is inserted into the information reproduction apparatus, that is, into the upper bracket 17. The front panel 250 is provided with an eject button 270. If the eject button 270 is operated, a drive source 300 described later drives the slider bracket 15 to eject the recording medium 200.

In the following, the operations of the loading and unloading means 100 are described by reference to FIG. 3 in addition to FIG. 2.

Figure 3A:
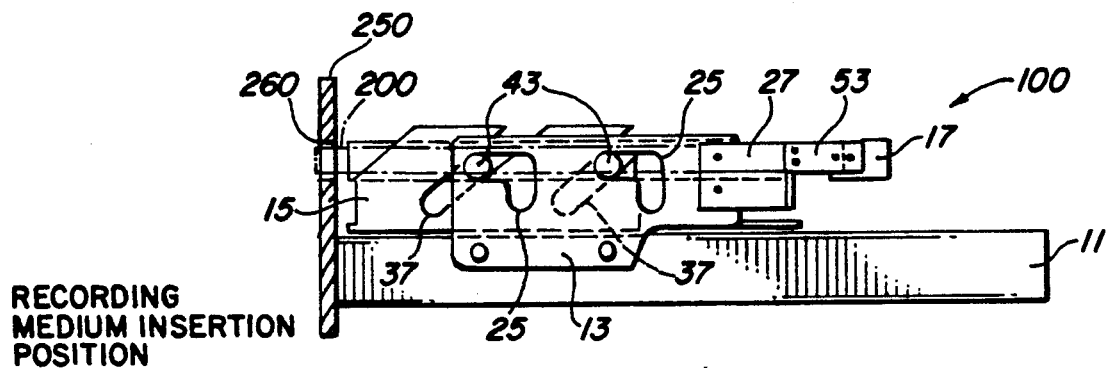
FIG. 3(A) to FIG. 3(C) are side views showing operations different from one another with respect to the loading and unloading means of the embodiment.

As shown in FIG. 3(A), at an initial state (where the recording medium 200 is not inserted in the information reproduction apparatus), the upper bracket 17 of the loading and unloading means 100 is arranged most closely to the insert slot 260 of the front panel 250. In this case, each of the pins 43 of the upper bracket 17 is located at the leftmost end (closest to the insert slot 260) of the horizontal part of each reversed L-shaped slot 25 and the slider bracket 15 is arranged most closely to the insert slot 260 in all strokes. If the recording medium 200 is inserted into the upper bracket 17 at the position closest to the insert slot 260, a position at which the recording medium 200 is present is referred to as an insertion position If the upper bracket 17 is present at the above position, the tip of each latch spring 53 rides on each latch releasing block 27. Therefore, the latch projections 57 at the tips of the latch springs 53 are out of contact with the notches 61 of the recording medium 200 and thus the recording medium 200 is placed in a state where it is released from the latch assemblies 59. Therefore, if the upper bracket 17 remains in the above position as in the case where the electric power source is turned off, the recording medium 200 is ejected from the insert slot 260 by means of a spring 51 even though the recording medium 200 is inserted into the innermost part of the upper bracket 17.

If the recording medium 200 is deeply inserted into the upper bracket 17 in a state shown in FIG. 3(A), the tip of the recording medium 200 operates a micro switch not shown, thereby the drive source 300 described later starts, its driving force is transmitted, through transmitting means described later, to the slider bracket 15, and then the slider bracket 15 starts to move to the inner part (move left in the figure).

Figure 3B:
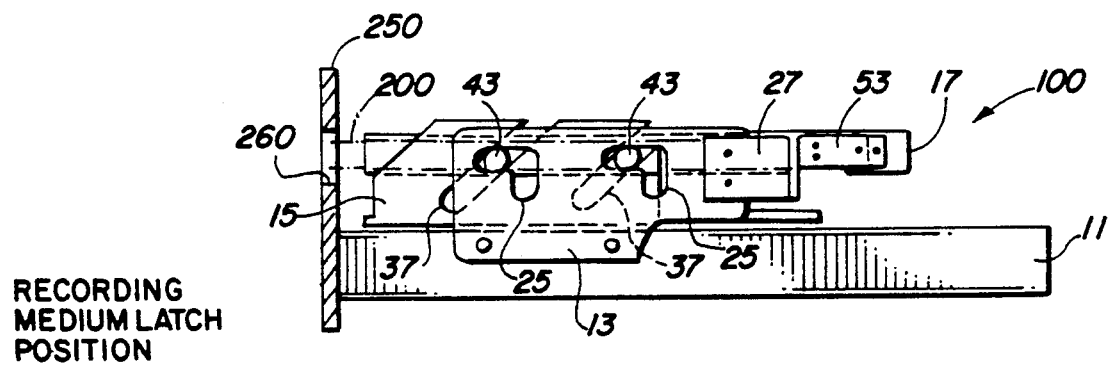

In the state (at the recording medium latch position) shown in FIG. 3(B), the slider bracket 15 slides toward the inner part a predetermined distance and the upper bracket 17 remains unchanged in a vertical direction as in FIG. 3(A) but moves in a horizontal direction toward the inner part a predetermined distance. As a result, the tip of each latch spring 53 moves from each latch releasing block 27 and the latch projections 57 enter the notches 61 of the recording medium 200, thus the recording medium 200 is latched, by means of the latch assemblies 59, in the upper bracket 17. The shutter 63 of the recording medium 200 is released by the shutter driving pin 47 according to the insertion of the recording medium 200 and if a hand is removed from the recording medium 200 before the latch assemblies 59 latch the recording medium 200, the recording medium 200 is returned toward the insert slot 260 by means of the spring 51. On the other hand, once the latch assemblies 59 latch the recording medium 200, the shutter 63 of the recording medium 200 will remain fully opened and be held by the upper bracket 17.

Figure 3C:
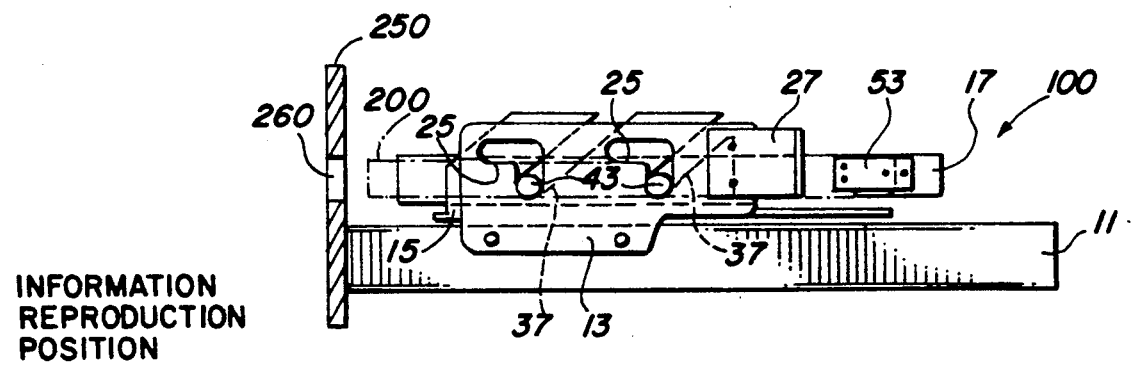

FIG. 3(C) shows the state where the recording medium 200 has reached the reproduction position. If the slider bracket 15 slides toward the inner part from the recording medium latch position shown in FIG. 3(B) and reaches the innermost position in all strokes, the pins 43 of the upper bracket 17 reach the bottom ends of the vertical sections of the reversed L-shaped slots 25 and a disk (not shown) within the recording medium 200 is mounted accordingly, on the spindle motor 21 so that information can be read from or written to the disk.

Figure 4:
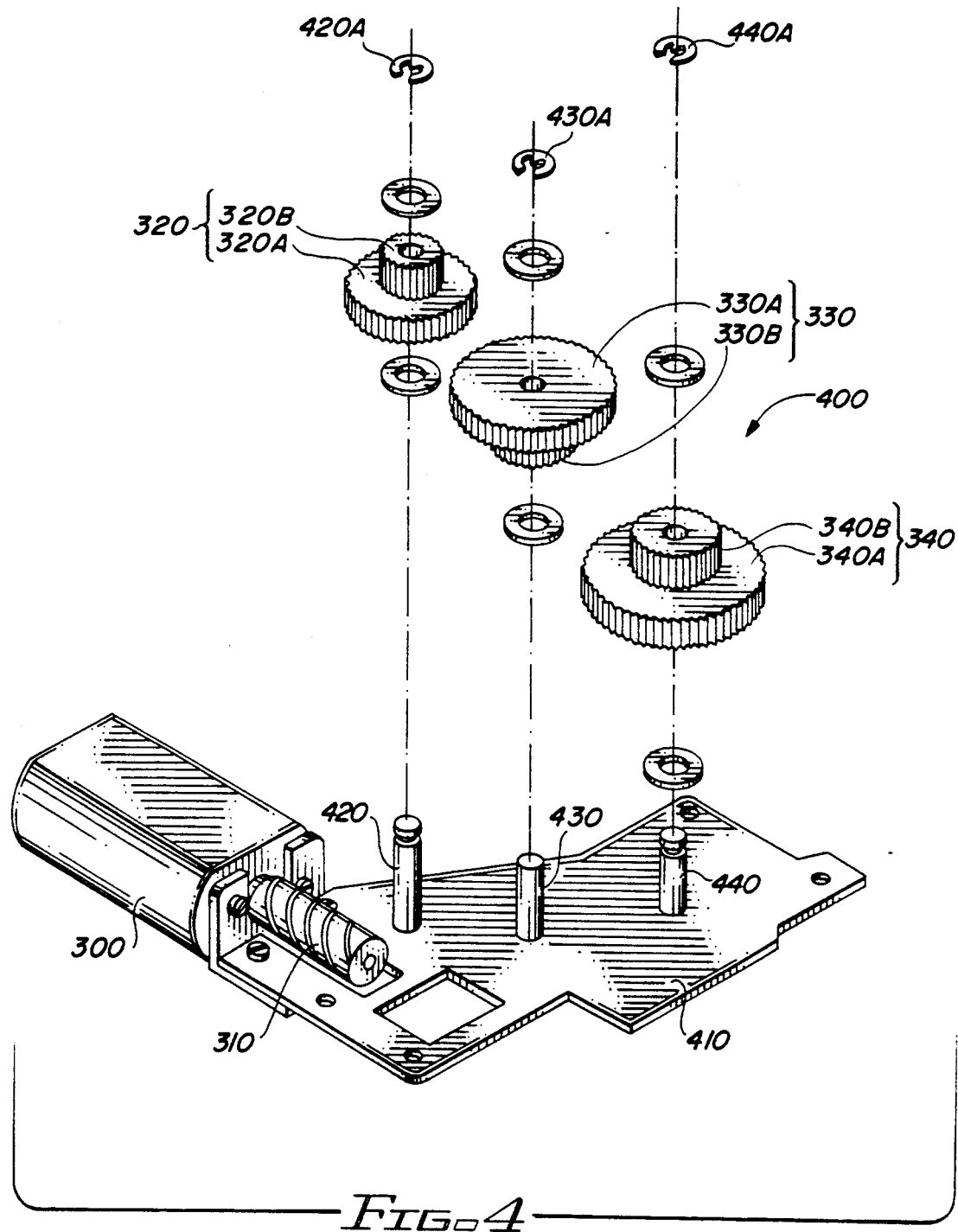
FIG. 4 is an enlarged perspective view showing a drive source and motive power transmitting means of the embodiment.

FIG. 4 shows the drive source 300 and the transmitting means 400 which construct the loading and unloading means 100. In the figure, the drive source 300 such as a motor, etc. is fixed to a base 410. For the transmitting means, a worm gear 310 is attached to an output shaft of the drive source 300, and the worm gear 310 is engaged with a large gear wheel 320A of a first gear 320. A small gear wheel 320B of the first gear 320 engages with a large gear wheel 330A of a second gear 330, a small gear wheel 330B of the second gear 330 engages with a large gear wheel 340A of a third gear 340, and a small gear wheel 340B of the third gear 340 engages with the rack gear 39A of the rack body 39 fixed to the slider bracket 15. From the base 410 for the transmitting means, relational shafts 420, 430, and 440 of the first, the second, and the third gears 320, 330, and 340 protrude, respectively. The worm gear 310, the first gear 320, the second gear 330, the third gear 340, and the rack gear 39A are arranged in a sequence of gears 455 for transmitting the driving force of the drive source 300. The relational shafts 420, 430, and 440 of the first, the second, and the third gears have washers 420A, 430A, and 440A, respectively, at their ends.

FIG. 5 shows an actuator 700 and locking means 800 of the embodiment.

The actuator 700 is referred to as a linear actuator on which a rotary actuator 702 is mounted. The rotary actuator 702 supports an objective lens 704 so that it can move freely. The actuator 700 includes a carriage assembly 708 with a plurality of bearings 710. To the base 11, a guide rail 712 which supports the bearings 710 is fixed. The actuator 700 is supported by the rail 712 so that it can move freely in the radial direction of the disk of the recording medium 200. The carriage assembly 708 includes a linear-type voice coil motor 714 which drives the actuator 700 in said radial direction. The base 11 is provided with a crash stop 750 which contacts the actuator 700 to restrict the range of its movement.

FIG. 6 is an enlarged perspective view of the carriage assembly 708 and the voice coil motor 714. The voice coil motor 714 comprises a coil 716, a magnet 760, a yoke 718, a counter yoke 720, and a bracket 722. The coil 716 is fixed to the carriage assembly 708. The counter yoke 720 is loosely inserted into the coil 716. The counter yoke 720 remains connected to the yoke 718, and is fixed, by a bracket 722, to the base 11. In the figure, the leakage flux from a magnet 760 is shown.

Figure 7A:
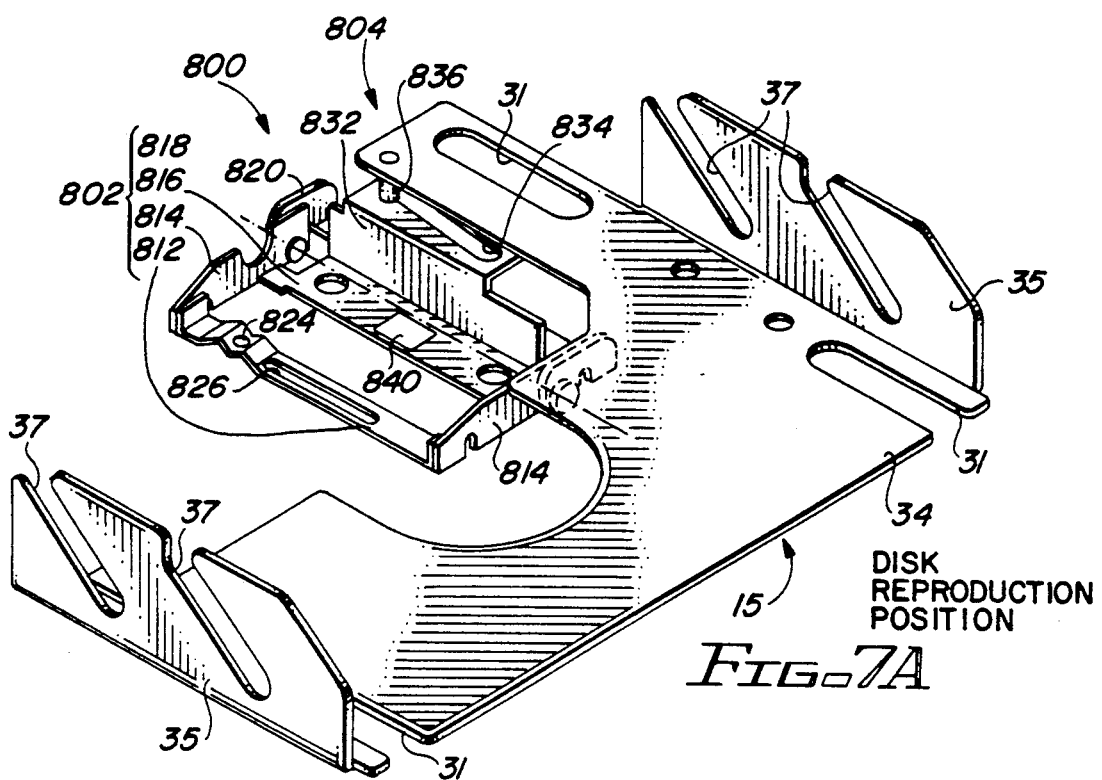
FIG. 7(A) and FIG. 7(B) are enlarged and exploded perspective views showing operations different from each other with respect to a slider bracket and locking means of the embodiment.
Figure 7B:
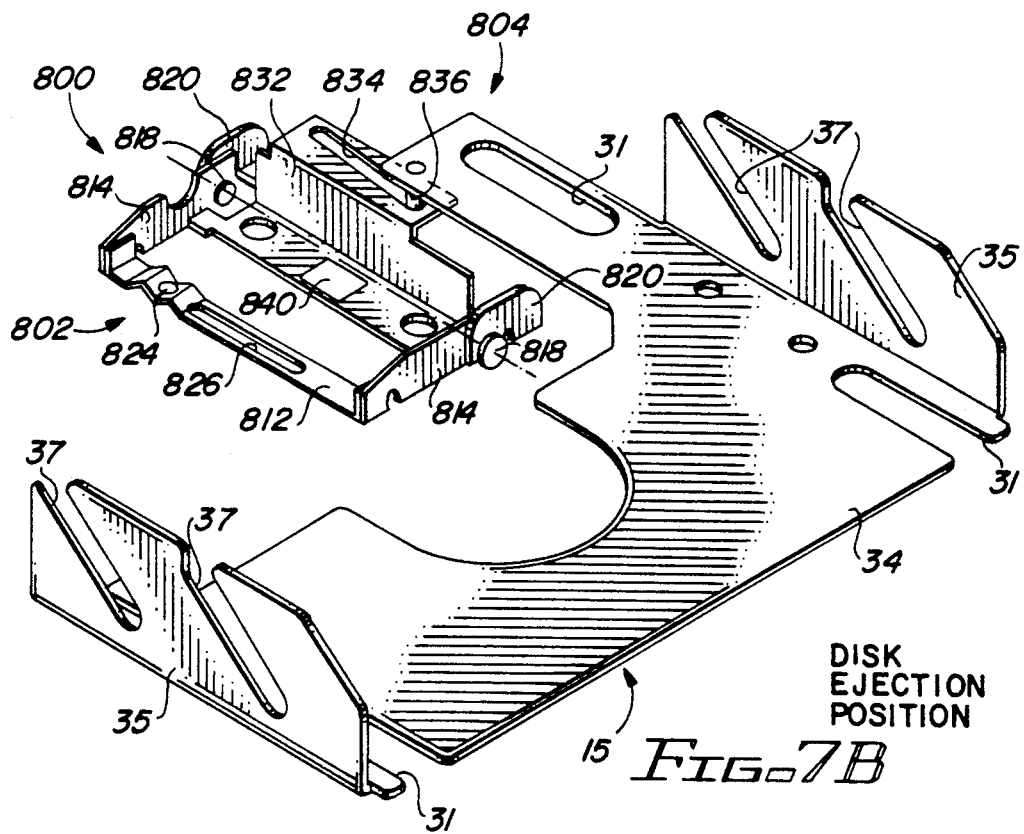

FIG. 7(A) and FIG. 7(B) are enlarged perspective views of locking means 800 comprising engagement means 802 which engage with the actuator 700 to restrict the movement of the actuator 700, linking means 804 for linking the engagement means 802 with the loading and unloading means 100, and magnetic means 806 (FIG. 1) for enhancing the engagement of the engagement means 802 and the actuator 700.

The engagement means 802 comprises a plate-shaped lifting member 812 a longitudinal axis of which is in the direction of the movement of the actuator 700 and with a wavily crooked part, an arm member 814 which contacts both ends of the lifting member 812, a base member 816, and engagement pins 822 (refer to FIG. 8). The tips of the arm members 814 on the side of the base member are supported, through shafts 818, to fixed plates 820 fastened to the base 11. Thus the lifting member 812 is supported so that it can turn freely up and down about the shafts 818.

The engagement pins 822 shown in FIG. 8 protrude from the bottom surface of the carriage assembly 708 (refer to FIG. 5). The lifting member 812 has an engagement hole 824 located in the valley of its wavy part as shown in FIG. 7. When the lifting member 802 is raised and the engagement pins 822 engage with the engagement hole 824, the actuator 700 is fixed to the base 11. In the lifting member 812, in addition to the engagement hole 824 a long and slender hole 826 elongated in the direction of the movement of the actuator 700 is made and the engagement pins 822 are loosely inserted and can move freely in the long and slender hole 826. Except when the engagement pins 822 engage with the engagement hole 824, the lifting member 812 is not an obstacle to the movement of the actuator 700.

The linking means 804 comprises a cam plate 832 fixed, as a single piece, to the base member 816, a cam hole 834 located in the cam plate 832, and a cam body 836 engaged with the cam hole 834. The cam body 836 protrudes downward form the back surface of the slider bracket 15 of the loading and unloading means 100. The cam hole 834 inclines in the direction of the movement of the slider bracket 15, that is, in the direction of the movement of the cam body 836 and, as shown in FIG. 7(A), if the slider bracket 15 is at the reproduction position of the disk, the cam body 836 is present in the innermost part (the leftmost end in the figure) of the cam hole 834 and thus the lifting member 812 is placed at the lowered position On the other hand, as shown in FIG. 7(B), if the slider bracket 15 is at the disk ejection (insertion) position, the cam body 836 is in the outermost part (the rightmost end in the figure) of the cam hole 834 and thus the lifting member 812 is placed at the raised position That is, if the slider bracket 15 moves forward and backward, the actuator 700 is locked by the engagement means 802 or removed from the engagement means 802.

Magnetic means 806 comprise a magnetic substance 840 (Fig. 7) and the magnet 760 (FIG. 6). The magnetic substance 840 is attached to the base member 816 and is arranged downward perpendicularly to the magnet 760 to receive the upward force of the leakage flux from the magnet 760. Thus the lifting member 812 always receives the upward force so that the lifting member 812 does not rattle.

In the following, the operations of the embodiment are described by reference to FIG. 1(A) and FIG. 1(B) as well as FIG. 8(A) to FIG. 8(C).

If the eject button 270 is pushed in a state where the recording medium 200 is inserted in the apparatus, the carriage assembly 708 moves toward the innermost part of said apparatus until it contacts crash stop 750 (rightmost stop shown in FIG. 5) and then stops. If the carriage assembly 708 contacts the crash stop 750 and stops, then the drive source 300 starts and the slider bracket 15 moves from the state shown in FIG. 7(A) to the state shown in FIG. 7(B) to eject the recording medium 200 from the apparatus. In this case, the locking means 800 operates through linking with the slider bracket 15.

If the slider bracket 15 is at the disk reproduction position (shown in FIG. 7(A)), the engagement means 802 of the locking means 800 is lowered and the locking means 800 unlocks the actuator 700. On the other hand, if the slider bracket 15 shifts to the disk ejection position (shown in FIG. 7(B)), then the engagement means 802 is raised to lock the actuator 700.

Figure 1B:
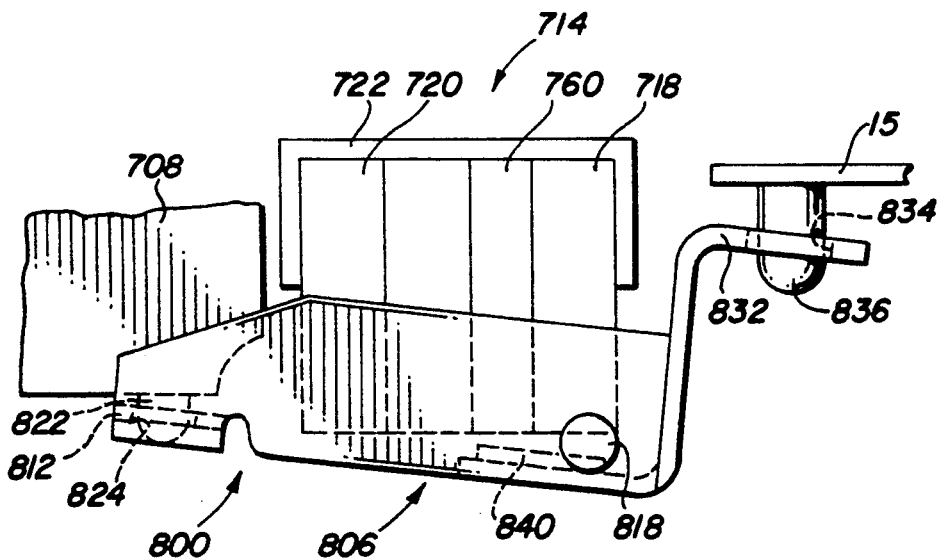

FIG. 1(A) and FIG. 1(B) show that the raising and the lowering of the lifting member 812 of the engagement means 802 locks and unlocks the carriage assembly 708, respectively. The raising and lowering of the lifting member 812 causes a rattle based on tolerance in parts. However, since the magnetic substance 840 on the base member 816 of the engagement means 802 always receives the upward force, a rattle is removed, the engagement pin 822 engages with the engagement hole 824 and thus the carriage assembly 708 is locked.

Figure 8A:
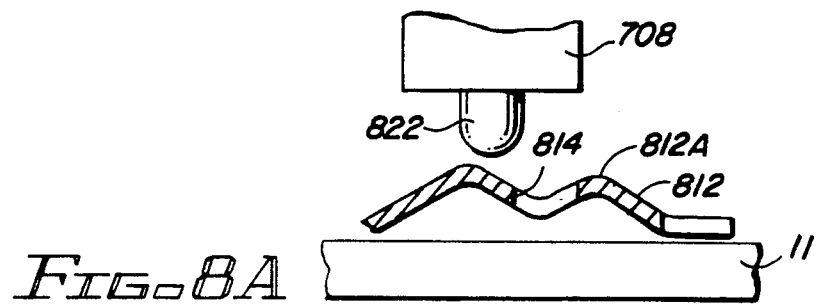
FIG. 8(A) to FIG. 8(C) are enlarged side views showing operations different from one another with respect to engagement pins and engagement of the embodiment.
Figure 8B:
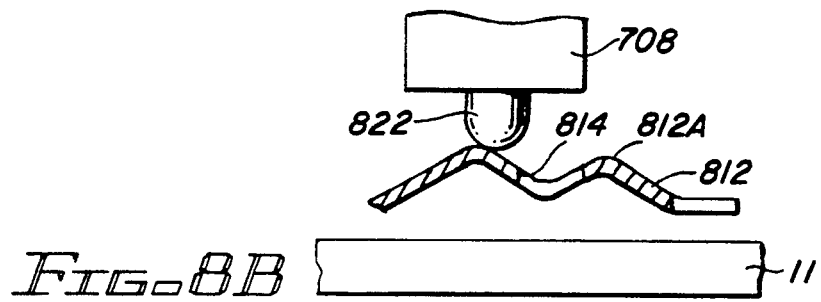
Figure 8C:
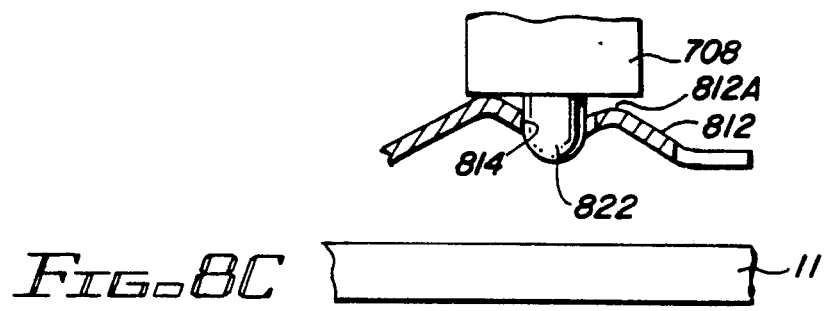

FIG. 8(A) to FIG. 8(C) show the state where the actuator 700 (carriage assembly 708) stops and then the lifting member 812 is raised to lock the carriage assembly 708, seen from an angle different from FIG. 1(A) and FIG. 1(B). As shown in the figures, since the engagement hole 824 of the engagement means 802 is made in the valley of the wavily crooked portion 812A in the lifting member 812, the engagement pin 822 engages with the engagement hole 824 even if the engagement pin 822 is not just above the engagement hole 824.

According to the embodiment, even if the range (stroke) within which the lifting member 812 moves is reduced due to accommodation in narrow space and the lifting member 812 rattles due to tolerance in parts, the actuator 700 can be locked since the magnetic means 806 for enhancing the engagement of the actuator 700 and the engagement means 800 is provided.

The magnetic means 806 is constructed so that the leakage flux from the magnet 760 of the voice coil motor 714 operates on the magnetic substance 840 of the lifting material 812. Therefore, it is unnecessary to provide a special magnet for the magnetic means 806 and thus an apparatus simple in construction can be put in practice.

The locking means 800 linking with the slider bracket 15 is arranged under the slider bracket 15 in a small space. If an attempt to link the locking means 800 with the upper bracket 17 is made, the linking means will become complex in construction, and make it particularly difficult to reduce the width of the apparatus. However, the embodiment shown facilitates small-sized apparatus.

The magnetic means is not restricted to the use of the leakage flux of the voice coil motor. However, if the leakage flux from the voice coil motor is used, the effect described above can be obtained. Further, the construction of the locking means is not restricted to the case of said embodiment. it will be appreciated that pins may protrude from the locking means and the pins may engage with holes made in the actuator. The actuator can be locked through concave or convex sections.

However, it will be appreciated that the actuator may be locked due to frictional force or compressing force, etc.

As is apparent from the above description, according to the present invention, an information reproduction apparatus is accommodated in a narrow space with an actuator that can be locked.

While the invention has been particularly shown and described with reference to a preferred embodiment thereof, it will be understood by those skilled in the art that various changes in form and details may be made therein without departing from the spirit and scope of the invention:

What is claimed is:

1. Disk storage apparatus for recording and playing back data on a recording medium comprising:
    an actuator for reading and writing data to and from said recording medium when said medium is in a reproduction position within said apparatus;
    loading and unloading means adjacent to said actuator for transferring said recording medium between an initial insertion position within said apparatus to said reproduction position; and
    locking means connected to said loading and unloading means for moving to a position in which contact is made with said actuator to engage said actuator and lock it in place when said loading and unloading means is in position to receive said medium, and for moving to a non-contact position when said loading and unloading means moves into said reproduction position, said locking means including magnetic means for enhancing the engagement of said locking means with said actuator 2. The apparatus of claim 1 further including a motor mounted on said actuator, said motor for moving a read/write head relative to said medium, said motor including a first magnetic flux producing means, said apparatus also including a second magnetic flux producing means mounted on said locking means, flux from said first and second magnetic flux producing means acting to enhance the engagement of said locking means with said actuator.

3. The apparatus of claim 1 wherein said loading and unloading means further includes
    bracket means for holding said medium, said bracket mounted within said loading and unloading means for moving vertically to and from said reproduction position; and
    a sliding bracket mounted within said loading and unloading means to move in the direction of insertion of said medium and connected to said bracket means to move in a vertical direction to said reproduction position, said locking means connected to said sliding bracket to rotate to an unlocked position when said sliding bracket moves vertically to said reproduction position.

4. The apparatus of claim 2 wherein said loading and unloading means further includes:
    bracket means for holding said medium, said bracket mounted within said loading and unloading means for moving vertically to and from said reproduction position; and
    a sliding bracket mounted within said loading and unloading means to move in the direction of insertion of said medium and connected to said bracket means to move in a vertical direction to said reproduction position, said locking means connected to said sliding bracket to rotate to an unlocked position when said sliding bracket moves vertically to said reproduction position.

5. Disk storage apparatus for recording and playing back data on a recording medium comprising:
    an actuator for reading and writing data to and from said recording medium when said medium is in a reproduction position within said apparatus, said actuator including motor means for moving said actuator relative to said recording medium and for moving said actuator to an innermost stop within said apparatus upon an eject command;
    loading and unloading means adjacent to said actuator for transferring said recording medium from an insertion position within said apparatus to said reproduction position and for moving said medium from said reproduction position upon an eject command; and
    locking means connected to said loading and unloading means for moving to a position in which contact is made with said actuator to engage said actuator and lock it in place when said loading and unloading means operates to move said medium from said reproduction position.

6. The apparatus of claim 5 wherein said motor means includes a first magnetic flux producing means, said apparatus also including a second magnetic flux producing means mounted on said locking means, flux from said first and second magnetic flux producing means acting to enhance the engagement of said locking means with said actuator.

7. The apparatus of claim 5 wherein said loading and unloading means further includes:
    bracket means for holding said medium, said bracket mounted within said loading and unloading means for moving vertically to and from said reproduction position; and a sliding bracket mounted within said loading and unloading means to move in the direction of insertion of said medium and connected to said bracket means to move in a vertical direction to said reproduction position, said locking means connected to said sliding bracket to rotate to an unlocked position when said sliding bracket moves vertically to said reproduction position.

8. The apparatus of claim 6 wherein said loading and unloading means further includes bracket means for holding said medium, said bracket mounted within said loading and unloading means for moving vertically to and from said reproduction position; and a sliding bracket mounted within said loading and unloading means to move in the direction of insertion of said medium and connected to said bracket means to move in a vertical direction to said reproduction position, said locking means connected to said sliding bracket to rotate to an unlocked position when said sliding bracket moves vertically to said reproduction position.

* * * * *